US012607554B2

(12) United States Patent
Katsu et al.

(10) Patent No.: US 12,607,554 B2
(45) Date of Patent: Apr. 21, 2026

(54) SYSTEM AND METHOD FOR QUANTUM ABSORPTION SPECTROSCOPY

(71) Applicants: SHIMADZU CORPORATION, Kyoto (JP); Kyoto University, Kyoto (JP)

(72) Inventors: Hideaki Katsu, Kyoto (JP); Koji Tojo, Kyoto (JP); Kenji Takubo, Kyoto (JP); Yuya Nagata, Kyoto (JP); Shigeki Takeuchi, Kyoto (JP); Ryo Okamoto, Kyoto (JP)

(73) Assignees: SHIMADZU CORPORATION, Kyoto (JP); Kyoto University, Kyoto (JP)

( * ) Notice: Subject to any disclaimer, the term of this patent is extended or adjusted under 35 U.S.C. 154(b) by 116 days.

(21) Appl. No.: 18/607,867

(22) Filed: Mar. 18, 2024

(65) Prior Publication Data

US 2024/0319081 A1      Sep. 26, 2024

(30) Foreign Application Priority Data

Mar. 20, 2023    (JP) ................................. 2023-043893

(51) Int. Cl.
*G01N 21/31*           (2006.01)
(52) U.S. Cl.
CPC ................................... *G01N 21/31* (2013.01)
(58) Field of Classification Search
CPC ...................................................... G01N 21/31
See application file for complete search history.

(56) References Cited

U.S. PATENT DOCUMENTS

| | | | |
|---|---|---|---|
| 10,648,908 B2 * | 5/2020 | Krivitskiy | .............. G01N 21/45 |
| 2008/0204762 A1 * | 8/2008 | Izatt | ................... G01B 9/02044 |
| | | | 356/521 |
| 2023/0020945 A1 | 1/2023 | Takeuchi et al. | |

FOREIGN PATENT DOCUMENTS

WO        2021/117632 A1      6/2021

OTHER PUBLICATIONS

Lindner et al., "Fourier transform infrared spectroscopy with visible light", vol. 28, No. 4, Optics Express, pp. 4426-4432, Feb. 17, 2020.

\* cited by examiner

*Primary Examiner* — Hina F Ayub
(74) *Attorney, Agent, or Firm* — Muir Patent Law, PLLC

(57)             ABSTRACT

The quantum optical system changes a phase of quantum interference occurring between a plurality of physical processes, in each of which a quantum entangled photon pair of a signal photon and an idler photon is generated. Each of a plurality of pixels outputs a detection signal of the signal photon in a state where a sample is arranged in an optical path of the idler photon. A processor calculates an absorption spectroscopy characteristic based on an interferogram indicating a variation in a signal intensity acquired from each of the plurality of pixels in accordance with the change in the phase of the quantum interference. The processor: applies a processing to reduce phase difference of the interferogram among the plurality of pixels; spatially integrates, over the plurality of pixels, the interferogram having gone through the processing to reduce phase differences; and calculates the absorption spectroscopy characteristic based on the integrated interferogram.

8 Claims, 10 Drawing Sheets

100

QUANTUM OPTICAL SYSTEM   2

Lp, Ls 222   23   221   214   3

Ls

26

Li 213   212

24   SP

25   ΔX

250

211   Lp

PHOTODETECTOR

1

LASER
LIGHT
SOURCE

4

CONTROLLER   PROCESSOR   MEMORY   STORAGE 401   402   403

5   6

INPUT
DEVICE

OUTPUT
DEVICE

<<WITHOUT SAMPLE>>

<<WITH SAMPLE>>

SYSTEM AND METHOD FOR QUANTUM ABSORPTION SPECTROSCOPY

CROSS REFERENCE TO RELATED APPLICATIONS

This nonprovisional application is based on Japanese Patent Application No. 2023-043893 filed on Mar. 20, 2023, with the Japan Patent Office, the entire contents of which are hereby incorporated by reference.

BACKGROUND

Field

The present disclosure relates to a system and a method for quantum absorption spectroscopy.

Description of the Background Art

In recent years, in the field of quantum technology, attempts have been made to achieve new functions using "quantum entangled photon pairs" which are photon pairs having quantum mechanical correlation. The field of study that obtains the absorption spectroscopy characteristic of a sample the using quantum entangled photon pairs is called "quantum absorption spectroscopy (QAS)". A technique related to the quantum absorption spectroscopy is proposed in WO2021/117632 A (Patent Document 1) and the like.

In contrast to Fourier transform infrared spectroscopy (FTIR) using a classical optical system, the quantum absorption spectroscopy disclosed in Patent Document 1 is called "quantum Fourier transform infrared spectroscopy" (Q-FTIR).

SUMMARY

Similarly to conventional absorption spectroscopy, there is always a demand for improving measurement accuracy also in quantum absorption spectroscopy. More specifically, in the quantum absorption spectroscopy, an optical path length difference (or delay time) determined by the optical path of pump light, signal light, and/or idler light may be different for each position in a light flux detected by a photodetector due to the deviation of the reflection/transmission wavefront of an optical element (for example, a moving mirror, a fixed mirror, or a lens) constituting a quantum optical system, and the deviation of the alignment of the optical element (for example, relative inclination between the moving mirror and the fixed mirror), and the like. Even at the same position in the light flux, the optical path length difference may be different for each wavelength due to the influence of wavelength dispersion by the optical element. Furthermore, when a sample to be measured is installed in the path of the idler light, the idler light may be affected by the deviation of the wavefront of transmission/reflection by the sample and wavelength dispersion by the sample. Due to such various factors, there is a possibility that the measurement accuracy of the absorption spectroscopy characteristic of the sample decreases.

The present disclosure has been made to solve the above problems, and one object of the present disclosure is to improve the measurement accuracy of quantum absorption spectroscopy.

A system for quantum absorption spectroscopy according to a first aspect of the present disclosure includes a quantum optical system, a photodetector, and a processor. The quantum optical system is configured to change a phase of quantum interference occurring between a plurality of physical processes, in each of which a quantum entangled photon pair of a signal photon and an idler photon is generated. The photodetector includes a plurality of pixels. Each of the plurality of pixels detects the signal photon in a state where a sample is disposed in an optical path of the idler photon, and outputs a detection signal from the detected signal photon. The processor calculates an absorption spectroscopy characteristic of the sample based on an interferogram, the interferogram indicating a variation in a signal intensity acquired from each of the plurality of pixels in accordance with the change in the phase of the quantum interference. The processor calculates the absorption spectroscopy characteristic of the sample. The processor: applies a processing to reduce phase difference of the interferogram among the plurality of pixels; spatially integrates, over the plurality of pixels, the interferogram having gone through the processing to reduce phase difference; and calculates the absorption spectroscopy characteristic based on the integrated interferogram.

A method for quantum absorption spectroscopy according to a second aspect of the present disclosure includes first to third steps. The first step is changing a phase of quantum interference occurring between a plurality of physical processes, in each of which a quantum entangled photon pair of a signal photon and an idler photon is generated. The second step is acquiring, in a state where a sample is disposed in an optical path of the idler photon, a detection signal from the signal photon from each of a plurality of pixels included in a photodetector. The third step is calculating an absorption spectroscopy characteristic of the sample based on an interferogram, the interferogram indicating a variation in a signal intensity acquired from each of the plurality of pixels in accordance with the change in the phase of the quantum interference. The calculating (third step) includes fourth to sixth steps. The fourth step is applying a processing to reduce phase difference of the interferogram among the plurality of pixels. The fifth step is spatially integrating, over the plurality of pixels, the interferogram having gone through the processing to reduce phase difference. The sixth step is calculating the absorption spectroscopy characteristic based on the integrated interferogram.

The above and other objects, features, aspects and advantages of the present invention will become apparent from the following detailed description of the present invention taken in conjunction with the accompanying drawings.

DESCRIPTION OF THE PREFERRED EMBODIMENTS

Figure 1:
FIG. 1 is a diagram showing the overall configuration of a quantum absorption spectroscopy system according to an embodiment of the present disclosure.

Hereinafter, embodiments of the present disclosure will be described in detail with reference to the drawings. Note that the same or corresponding parts in the drawings are denoted by the same reference numerals, and the description thereof will not be repeated.

Definition of Terms

In the present disclosure and the embodiments thereof, an ultraviolet range means a wavelength range of 10 nm to 360 nm. A visible range means a wavelength range of 360 nm to 1050 nm. A near-infrared range means a wavelength range of 1050 nm to 2 μm. A mid-infrared range means a wavelength range of 2 μm to 5 μm. A far-infrared range means a wavelength range of 5 μm to 20 μm. An ultra-far infrared range (terahertz range) means a wavelength range of 20 μm to 1 mm. An infrared range may include all of a near-infrared range, a mid-infrared range, a far-infrared range, and an ultra-far-infrared range.

Embodiment

In an embodiment of the present disclosure, a configuration for measuring the absorption spectroscopy characteristic of a sample in an infrared region by a quantum absorption spectroscopy system according to the present disclosure will be described. However, a wavelength range measurable by the quantum absorption spectroscopy system according to the present disclosure is not limited to the infrared range, and may be other wavelength ranges such as an ultraviolet range and a visible range.

<Overall Configuration>

FIG. 1 is a diagram showing the overall configuration of a quantum absorption spectroscopy system according to an embodiment of the present disclosure. A quantum absorption spectroscopy system 100 measures the infrared absorption spectroscopy characteristic of a sample using quantum entangled photon pairs. The infrared absorption spectroscopy characteristic of the sample includes, for example, the Fourier spectrum, complex transmittance spectrum, and infrared absorption spectrum of the sample. Quantum absorption spectroscopy system 100 includes, for example, a laser light source 1, a quantum optical system 2, a photodetector 3, a controller 4, an input device 5, and an output device 6.

Laser light source 1 emits pump light for exciting a nonlinear optical crystal 23 (described later). In the figure, the pump light is indicated by Lp. In this example, laser light source 1 emits a continuous wave (CW) laser beam within the visible range. For example, a semiconductor laser that emits a green laser beam having a wavelength of 532 nm can be employed as laser light source 1.

Quantum optical system 2 causes quantum interference between a plurality of physical processes that generate a quantum entangled photon pair of a signal photon and an idler photon. In the figure, the optical path of signal light (light composed of a signal photon) is indicated by Ls, and the optical path of idler light (light composed of an idler photon) is indicated by Li. Hereinafter, the optical path of the signal light may be abbreviated as a "signal optical path", and the optical path of the idler light may be abbreviated as an "idler optical path".

Quantum optical system 2 is, for example, an optical system to which a configuration similar to that of a Michelson interferometer is applied. Quantum optical system 2 includes, for example, lenses 211 to 214, dichroic mirrors 221, 222, a nonlinear optical crystal 23, a sample holder 24, a moving mirror 25, and a fixed mirror 26.

Lens 211 is disposed between laser light source 1 and dichroic mirror 221. Lens 211 collects the pump light from laser light source 1 and focuses the collected pump light on nonlinear optical crystal 23.

Dichroic mirror 221 is disposed between lens 211 and nonlinear optical crystal 23. Dichroic mirror 221 transmits light in a wavelength range including the wavelength of the signal light and reflects light outside the wavelength range. In this example, the wavelength of the pump light is 532 nm. The wavelength of the signal light is in, for example, a wavelength range of greater than or equal to 603 nm and less than or equal to 725 nm. The wavelength of the idler light is in, for example, a wavelength range of greater than or equal to 2 μm and less than or equal to 4.5 μm. Therefore, while dichroic mirror 221 transmits the signal light, dichroic mirror 221 reflects the pump light and the idler light. The pump light is reflected by dichroic mirror 221 and applied to nonlinear optical crystal 23.

Nonlinear optical crystal 23 generates the signal light and the idler light from the pump light collected by lens 211. More particularly, nonlinear optical crystal 23 generates a photon pair of a signal photon and an idler photon through spontaneous parametric down-conversion (SPDC) of the pump light. The principle of the quantum absorption spectroscopy using nonlinear optical crystal 23 will be described with reference to FIG. 2.

Nonlinear optical crystal 23 is, for example, a lithium niobate ($LiNbO_3$) crystal. In this case, the signal light is visible light and the idler light is infrared light (more specifically, near-infrared light or mid-infrared light). However, the type of nonlinear optical crystal 23 is not particularly limited. Lithium tantalate ($LiTaO_3$), silver thiogallate ($AgGaS_2$), gallium phosphide (GaP), gallium arsenide (GaAs), or zinc selenide (ZnSe) or the like can also be employed.

In the present specification, when a compound is expressed by a stoichiometric composition formula, the stoichiometric composition formula is merely a representative example. A composition ratio may be non-stoichiometric. For example, when lithium niobate is expressed as "$LiNbO_3$", unless otherwise specified, lithium niobate is not limited to the composition ratio of "Li/Nb/O=1/1/3", and may contain Li, Nb, and O in an optional composition ratio. The same applies to other compounds.

Quantum optical system 2 may include a quasi-phase-matched (QPM) device (not shown) instead of nonlinear optical crystal 23. The QPM device may be a chirp type element or a fan type element. Idler light having a flat intensity distribution over the entire wide wavelength range can be generated by employing a QPM device including a suitable material and a nonlinear optical crystal of a suitable polarization inversion period. As a result, the wavelength range in which infrared absorption spectroscopy is applicable can be widened. Alternatively, quantum optical system 2 may include a ring resonator or an optical waveguide (both not shown) instead of nonlinear optical crystal 23.

Dichroic mirror 222 is disposed between nonlinear optical crystal 23 and moving mirror 25 and between nonlinear optical crystal 23 and fixed mirror 26. In this example, dichroic mirror 222 transmits the visible light and reflects the infrared light. The visible-range signal light is transmitted through dichroic mirror 222 together with the pump light and is directed toward fixed mirror 26. Meanwhile, the idler light in the infrared range is reflected by dichroic mirror 222 and is directed toward moving mirror 25. Dichroic mirror 222 may transmit the infrared light and reflect the visible light.

Lens 212 is disposed between dichroic mirror 222 and sample holder 24. Lens 212 collimates the idler light reflected by dichroic mirror 222. Lens 213 is disposed between dichroic mirror 222 and fixed mirror 26. Lens 213 collimates the pump light and the signal light transmitted through dichroic mirror 222.

Sample holder 24 is disposed between nonlinear optical crystal 23 and moving mirror 25. Sample holder 24 holds a sample (In the figure, indicated by SP). A material transparent to the idler light (the infrared light in this example) is used as the material of sample holder 24. The idler light is applied to the sample, and the transmitted light is directed to moving mirror 25.

Moving mirror 25 moves along the propagation direction of the idler light. Specifically, the moving mirror 25 is provided with a drive device 250. Drive device 250 is, for example, an electric actuator (a servo motor or a stepping motor or the like) that is mechanically displaced in accordance with a control command from controller 4. Drive device 250 may be a piezoelectric element (piezo element) that is displaced according to an applied voltage from controller 4. The idler optical path can be swept by periodically changing the position of moving mirror 25 (reciprocating moving mirror 25) using drive device 250.

Moving mirror 25 is preferably a flat mirror and reflects the idler light transmitted through the sample. The reflected idler light is further reflected by dichroic mirror 222 and returns to nonlinear optical crystal 23. The idler light passes through nonlinear optical crystal 23, but does not reach photodetector 3 because it is reflected by dichroic mirror 221.

Instead of moving mirror 25 that moves along the propagation direction of the idler light, a moving mirror that moves along the propagation direction of the signal light may be provided. That is, either the idler optical path or the signal optical path may be swept.

In this example, the phase of the quantum interference is modulated by the movement of moving mirror 25. However, the modulation of the phase of the quantum interference may be achieved by a phase modulator (not shown) such as an electro-optic modulator (EOM). Quantum optical system 2 may include a phase modulator instead of or in addition to moving mirror 25. For example, the phase may be finely modulated using a phase modulator after the phase is relatively roughly modulated using moving mirror 25.

Fixed mirror 26 is, for example, a flat mirror, and reflects the pump light and the signal light each transmitted through dichroic mirror 222. The reflected light of the pump light and the reflected light of the signal light are transmitted through dichroic mirror 222 again and return to nonlinear optical crystal 23. The pump light passes through nonlinear optical crystal 23, but is reflected by dichroic mirror 221. Meanwhile, the signal light passes through nonlinear optical crystal 23 and is also transmitted through dichroic mirror 221. Fixed mirror 26 may be a concave mirror. In this case, lens 213 can be omitted.

Lens 214 is disposed between dichroic mirror 221 and photodetector 3. Lens 214 collects the signal light transmitted through dichroic mirror 221 and outputs the collected signal light to photodetector 3.

Figure 6:
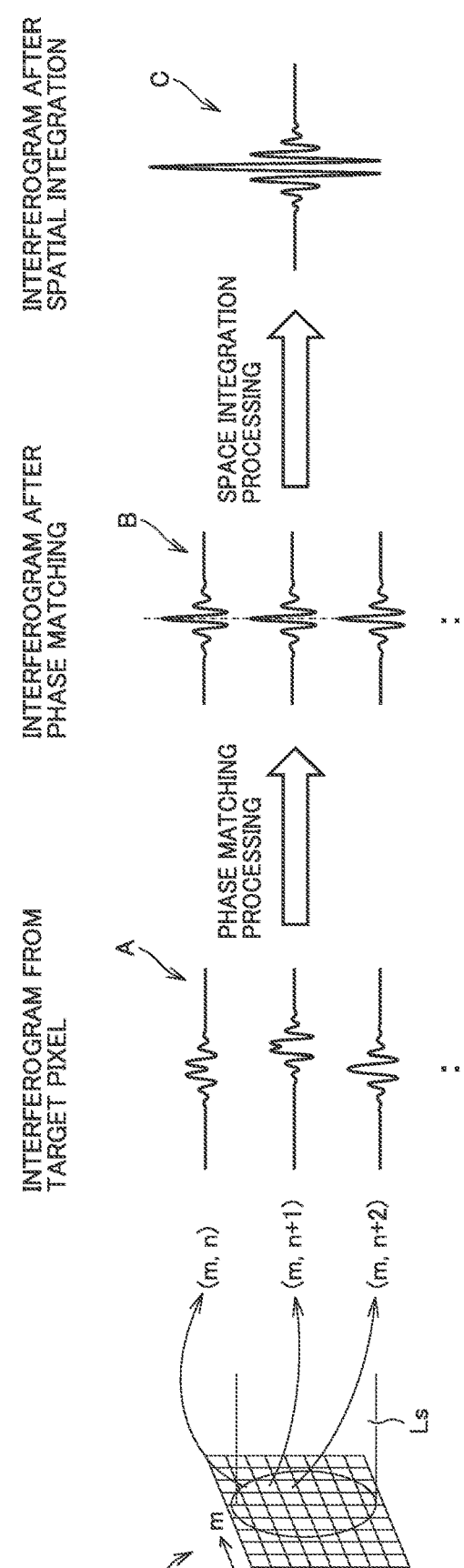
FIG. 6 is a conceptual diagram of the arithmetic processing by the constructive integration processing unit.

Photodetector 3 is a multi-pixel photodetector including a plurality of pixels arranged for example, in a two-dimensional array (see FIG. 6). Photodetector 3 is a silicon-based photodetector and has optical characteristic capable of spectroscopy of visible light (and a part of near-infrared light). Specifically, photodetector 3 is a charged-coupled device (CCD) image sensor, or a complementary metal-oxide-semiconductor (CMOS) image sensor or the like. In this example, a scientific CMOS (sCMOS) image sensor is used. Photodetector 3 detects the signal light in response to a control command from controller 4. Photodetector 3 outputs a signal indicating the number of detected signal photons by each of the plurality of pixels. Hereinafter, a signal waveform indicating a change in the number of detected signal photons accompanied by the sweep of the idler optical path (the reciprocating motion of moving mirror 25) is referred to as "interferogram" (quantum interference waveform).

Controller 4 includes a processor 401, a memory 402, and a storage 403. Processor 401 is, for example, a central processing unit (CPU) or a micro-processing unit (MPU). Memory 402 is a volatile memory such as a random access memory (RAM). Storage 403 is a rewritable nonvolatile memory such as a hard disk drive (HDD), a solid state drive (SSD), or a flash memory. Storage 403 stores a system program including an operating system (OS) and a control program including a computer-readable code necessary for control operation. Processor 401 reads the system program and the control program stored in storage 403, develops the system program and the control program in memory 402, and executes the system program and the control program.

Note that, in the present specification, the "processor" is not limited to a narrowly-defined processor that executes processing by a stored program method, and may include a hardwired circuit such as an application specific integrated circuit (ASIC) or a field-programmable gate array (FPGA). Therefore, the term "processor" can also be read as processing circuitry in which processing is predefined by computer-readable code and/or hardwired circuitry.

Controller 4 controls the devices (laser light source 1 and drive device 250) in quantum absorption spectroscopy system 100. Controller 4 executes various types of arithmetic processing for achieving quantum absorption spectroscopy. More specifically, controller 4 calculates the infrared absorption spectroscopy characteristic of the sample based on a signal (detection signal) indicating the number of detected signal photons from photodetector 3.

Input device 5 is a keyboard or a mouse or the like, and receives the input operation of an operator who performs various measurements to be described later. Output device 6 is, for example, a display, and displays various information (such as the results of the arithmetic processing by controller 4). Thus, an operator can confirm the infrared absorption spectroscopy characteristics such as the Fourier spectrum of the sample.

<Measurement Principle>

Figure 2:
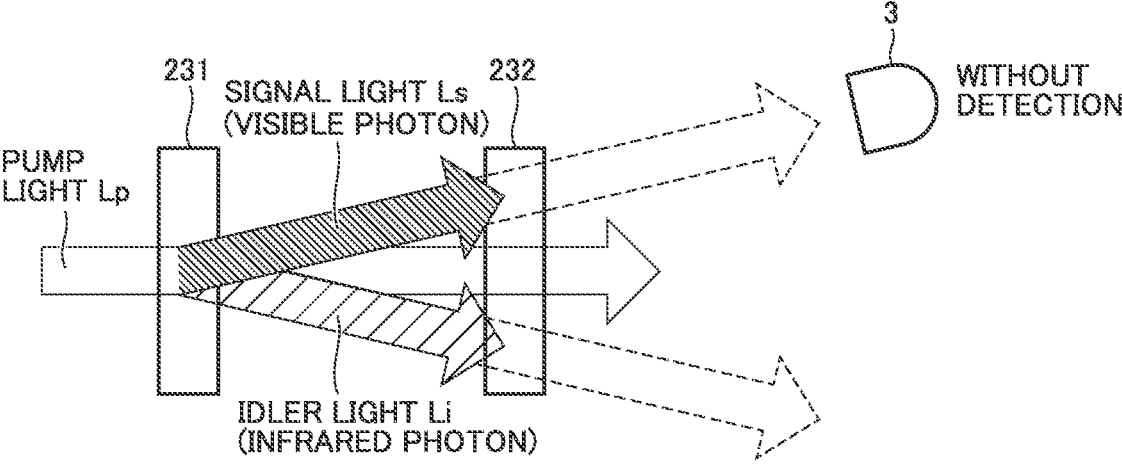
FIG. 2 is a conceptual diagram for describing the principle of quantum absorption spectroscopy.
Figure 2:
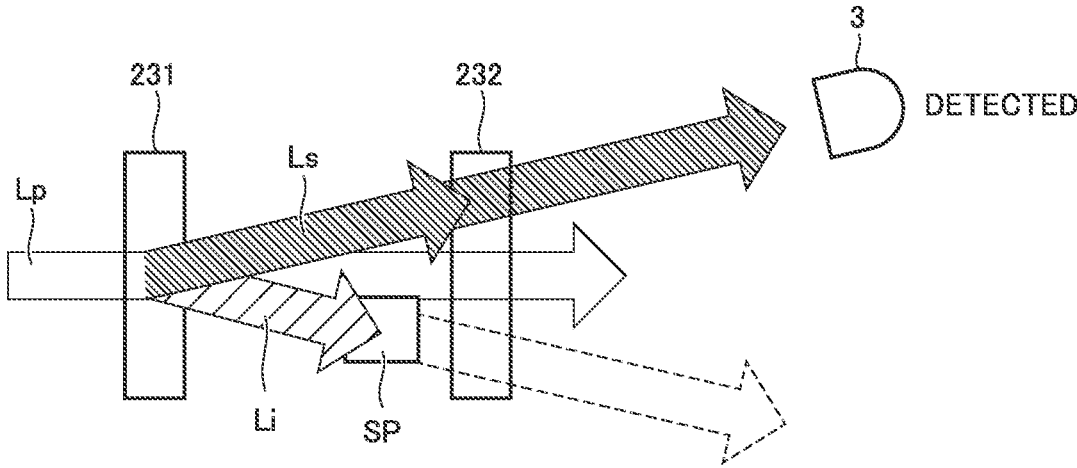

FIG. 2 is a conceptual diagram for describing the principle of quantum absorption spectroscopy. In FIG. 1, the configuration in which only one nonlinear optical crystal 23 is disposed on the optical path of the pump light has been described. In FIG. 2, in order to facilitate understanding of the measurement principle, a configuration in which two nonlinear optical crystals are disposed on the optical path of the pump light will be described as an example. The two nonlinear optical crystals are described as a first crystal 231 and a second crystal 232.

When first crystal 231 is irradiated with the pump light from laser light source 1, one photon having relatively large energy is divided into two photons having smaller energy while satisfying the energy conservation law by the SPDC in first crystal 231. In the example shown in FIG. 2, from one visible photon (pump photon), a quantum entangled photon pair of one visible photon (signal photon) and one infrared photon (idler photon) is generated. Irradiation of second crystal 232 with the pump light similarly generates a quantum entangled photon pair of one visible photon and one infrared photon. In this example, photodetector 3 is disposed in the direction of travel of the visible photon of the quantum entangled photon pair.

Quantum interference occurs between an event in which a quantum entangled photon pair is generated by first crystal 231 (hereinafter, referred to as "first physical process") and an event in which a quantum entangled photon pair is generated by second crystal 232 (hereinafter, referred to as "second physical process"). More specifically, when a probability amplitude representing the first physical process and a probability amplitude representing the second physical process are added, if the two probability amplitudes are in the same phase, the first physical process and the second physical process intensify each other, whereas, if the two probability amplitudes are in opposite phases, the first physical process and the second physical process cancel each other (quantum interference effect). Hereinafter, destructive interference in which the first physical process and the second physical process cancel each other will be described as an example. However, quantum optical system 2 may cause constructive interference in which the first physical process and the second physical process intensify each other.

When a sample that is an infrared absorber is not disposed on the idler optical path, the first physical process and the second physical process are indistinguishable from each other, and the first physical process and the second physical process cause quantum interference (cancel each other in this example). In this case, it is observed that a quantum entangled photon pair is not generated at a post stage of the second crystal 232. That is, the signal light (visible photon) is not detected by photodetector 3. In contrast, when the sample is disposed on the idler optical path, the idler light is absorbed by the sample. Then, the first physical process and the second physical process can be distinguished, whereby quantum interference between the first physical process and the second physical process becomes incomplete. As a result, the signal light is detected by photodetector 3.

As described above, in the quantum absorption spectroscopy, one visible photon (signal photon) of the quantum entangled photon pair is detected by photodetector 3, which makes it possible to determine that the other infrared photon (idler photon) is absorbed by the sample.

<Arithmetic Processing>

Figure 3:
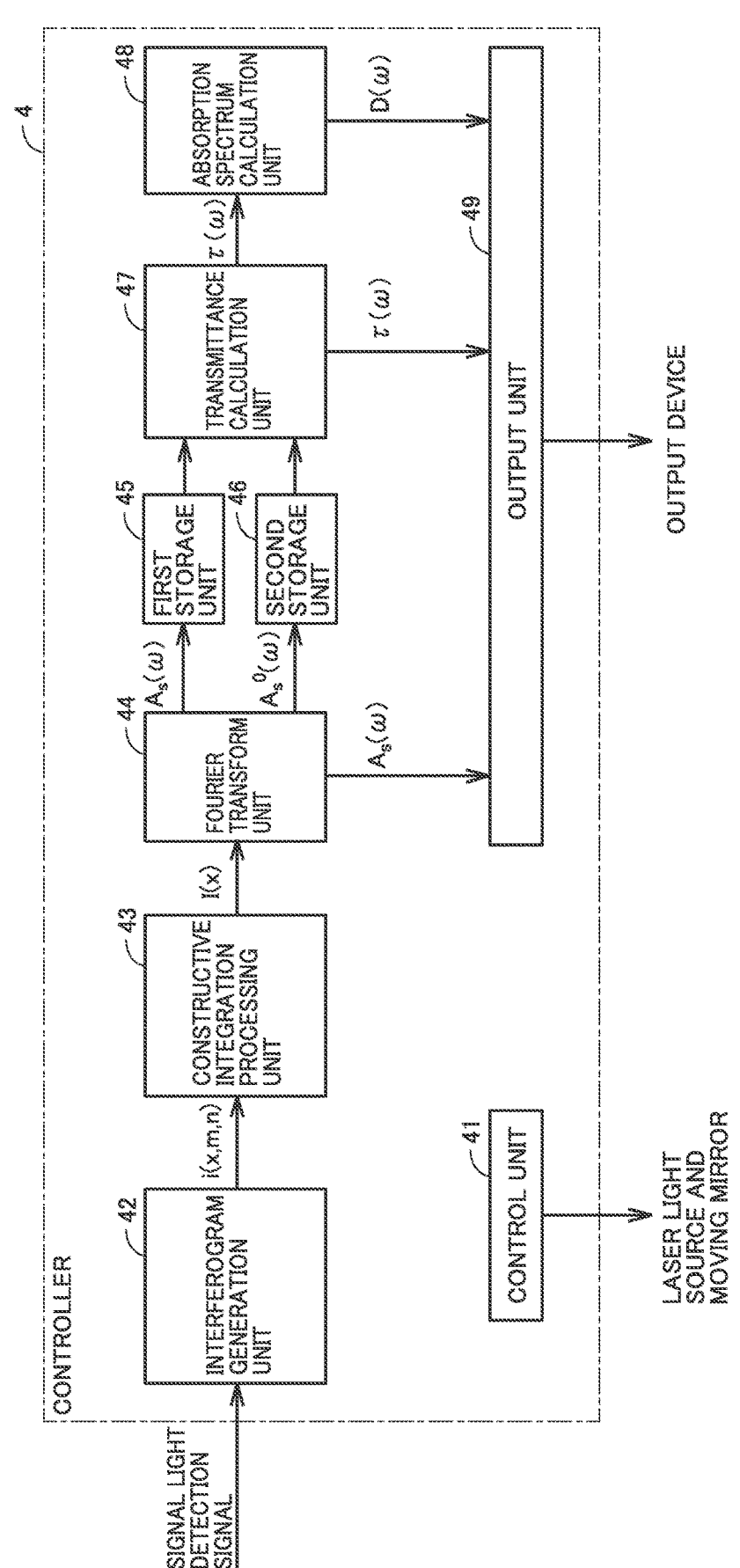
FIG. 3 is a functional block diagram for schematically describing arithmetic processing by a controller.

FIG. 3 is a functional block diagram for schematically describing arithmetic processing by a controller 4. Controller 4 includes a control unit 41, an interferogram generation unit 42, a constructive integration processing unit 43, a Fourier transform unit 44, a first storage unit 45, a second storage unit 46, a transmittance calculation unit 47, an absorption spectrum calculation unit 48, and an output unit 49.

In multi-pixel photodetector 3, a plurality of pixels is typically arranged in a two-dimensional array. Hereinafter, a pixel arranged in a m-th position in a row direction and arranged in a n-th position in a column direction is referred to as pixel (m, n) (where $1 \leq m \leq M$, $1 \leq n \leq N$). An optical path length difference between the signal optical path and the idler optical path is referred to as x.

Control unit 41 controls devices in quantum absorption spectroscopy system 100. More specifically, control unit 41 controls laser light source 1 so that the output (laser power) of the laser light becomes a set value. The laser power during the measurement is basically kept constant. Control unit 41 controls drive device 250 so that moving mirror 25 moves (reciprocates).

Interferogram generation unit 42 generates an interferogram of each pixel on the basis of the detection signal of signal light from each of a plurality of pixels included in photodetector 3. More specifically, the reciprocating motion of moving mirror 25 causes optical path length difference x between the signal optical path and the idler optical path to periodically change. The detection signal of the signal light from each pixel is a function of the optical path length difference x. The interferogram generated from the detection signal of the pixel (m, n) is referred as i(x, m, n). Interferogram generation unit 42 outputs, for each of the plurality of pixels, the interferogram i(x, m, n) of the pixel to constructive integration processing unit 43.

It is also conceivable to calculate the interferogram I(x) of entire photodetector 3 simply by spatially integrating the interferogram i(x, m, n) generated from each of a plurality of pixels for all pixels ($1 \leq m \leq M$, $1 \leq n \leq N$). However, as described above, in the Q-FTIR, there are various error factors (difference in optical path length difference x between pixels, difference in optical path length difference x between wavenumbers, and influence of wavelength dispersion by optical element and sample, and the like) in quantum optical system 2. As such, the interferograms i(x, m, n) may cancel each other between the pixels, and the intensity of the interferogram I(x) (the amplitude of the quantum interference corresponding to the power spectrum) may decrease. Therefore, in the present embodiment, constructive integration processing unit 43 executes arithmetic processing for avoiding the cancellation of the interferograms i(x, m, n) between the pixels.

Figure 4:
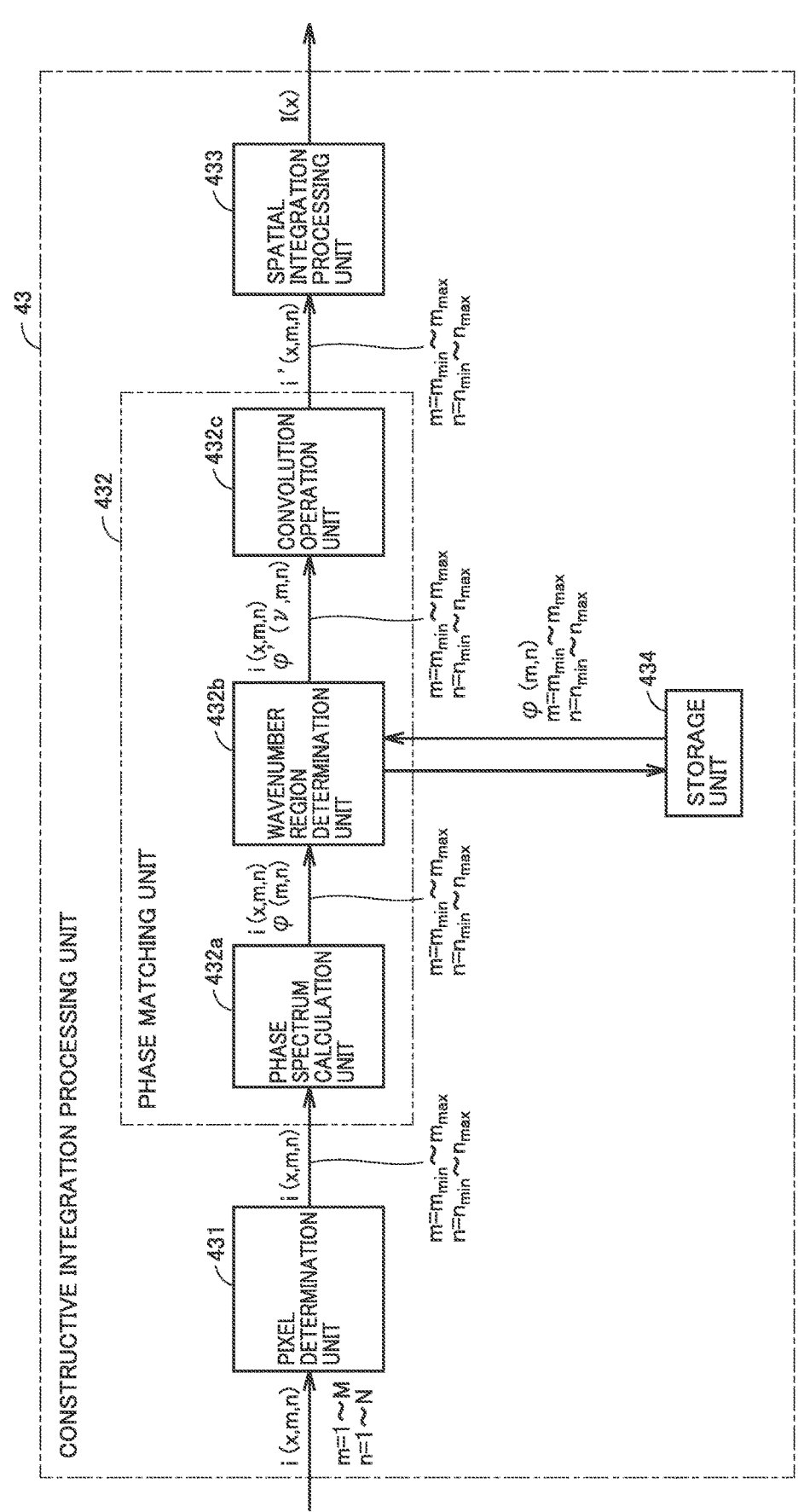
FIG. 4 is a functional block diagram for describing in detail arithmetic processing by a constructive integration processing unit.

FIG. 4 is a functional block diagram for describing in detail arithmetic processing by constructive integration processing unit 43. Constructive integration processing unit 43 includes, for example, a pixel determination unit 431, a phase matching unit 432, a spatial integration processing unit 433, and a storage unit 434.

Pixel determination unit 431 determines, for each pixel (m, n), whether the interferogram i(x, m, n) received from interferogram generation unit 42 is set as a target of processing (hereinafter, also referred to as "phase matching processing") to be described later by phase matching unit 432. Due to stray light in quantum optical system 2, and dark noise of photodetector 3, and the like, a detection signal exceeding a certain level can be generated even from a pixel in which a signal photon is not detected. Pixel determination unit 431 executes determination processing for excluding the interferogram from such a pixel from the target of the phase matching processing. For example, pixel determination unit 431 determines, for each pixel (m, n), whether the maximum signal intensity (the maximum number of detected signal photons) of the interferogram i(x, m, n) is greater than a threshold $i_{th}$ (corresponding to a "first threshold" according to the present disclosure) (see the following Formula (1)).

[Expression 1]

$$\max(i(x, m, n)) > i_{th} \qquad (1)$$

Figure 5:
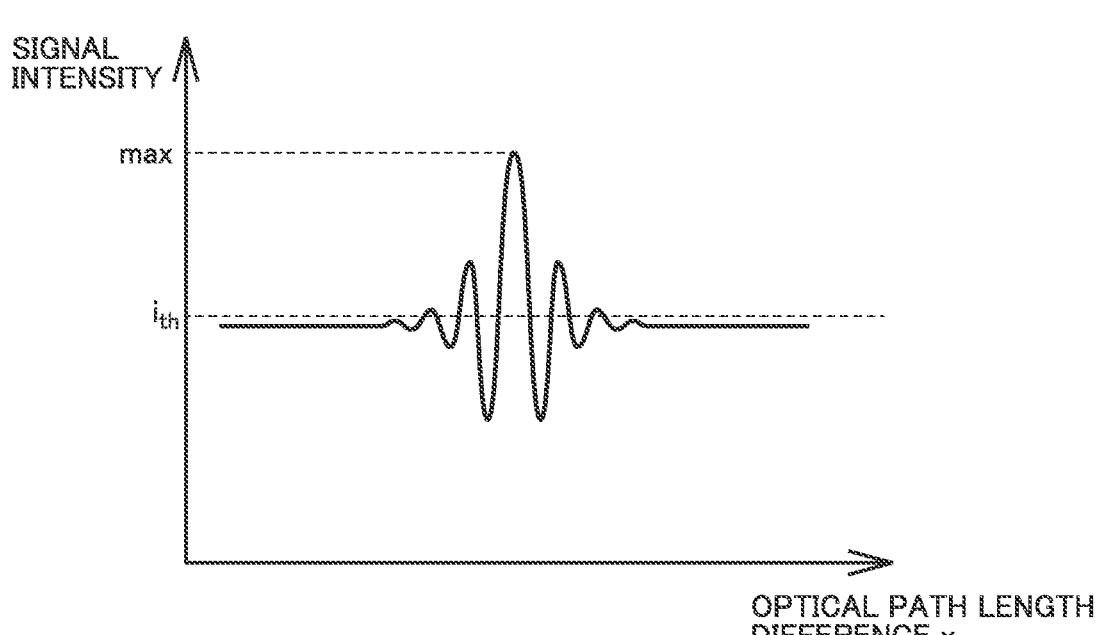
FIG. 5 is a conceptual diagram of determination processing by a pixel determination unit.

FIG. 5 is a conceptual diagram of determination processing by pixel determination unit 431. A horizontal axis represents optical path length difference x, and a vertical axis represents a signal intensity. Pixel determination unit 431 sets the interferogram from the pixel whose maximum signal intensity is greater than threshold $i_{th}$ as a target of the phase matching processing, and excludes the interferogram from the pixel whose maximum signal intensity is less than or equal to threshold $i_{th}$ from the target of the phase matching processing.

Hereinafter, the pixel whose interferogram is determined to be the target of the phase matching processing is referred to as "target pixel". In this example, the target pixel is a pixel arranged in a range from $m_{min}$ to $m_{max}$ in the row direction and arranged in a range from $n_{min}$ to $n_{max}$ in the column direction. Pixel determination unit 431 outputs an interferogram i(x, m, n) (where $m_{min} \leq m \leq m_{max}$, $n_{min} \leq n \leq n_{max}$) of each of the plurality of target pixels to phase matching unit 432.

FIG. 6 is a conceptual diagram of arithmetic processing by constructive integration processing unit 43. A waveform A shows three interferograms generated from three target pixels (m, n), (m, n+1), and (m, n+2) aligned in the column direction. It can be seen that phases are shifted between these interferograms.

Returning to FIG. 4, phase matching unit 432 reduces phases shifted from each other between the interferograms from the plurality of target pixels, and ideally matches (aligns) the phases. Phase matching unit 432 includes, for example, a phase spectrum calculation unit 432a, a wavenumber region determination unit 432b, and a convolution operation unit 432c.

Phase spectrum calculation unit 432a calculates phase spectrum q(v, m, n) (v: wavenumber) of the interferogram by performing Fourier transform of the interferogram i(x, m, n) for each target pixel. Specifically, as shown in the following formula (2), an angle function for calculating an angle (phase angle) on a complex plane is used. Phase spectrum calculation unit 432a outputs phase spectrum q(v, m, n) of the interferogram of each of the plurality of target pixels (m, n) to wavenumber region determination unit 432b together with the interferogram i(x, m, n).

[Expression 2]

$$\varphi(v, m, n) = \text{angle}\left(\sum^{x} i(m, n)\exp(-i2\pi xv)\right) \qquad (2)$$

Wavenumber region determination unit 432b determines, for each wavenumber v (or for each wavenumber region having a predetermined width), whether or not the wavenumber is set as the target of phase matching processing. For example, the wavenumber region determination unit 432b determines whether or not the absolute value (spectral intensity) of the Fourier-transformed interferogram is greater than a threshold $s_{th}$ (corresponding to a "second threshold" according to the present disclosure) for each wavenumber v (see the following Formula (3)).

[Expression 3]

$$\text{abs}\left(\sum^{x} i(x, m, n)\exp(-i2\pi xv)\right) > s_{th} \qquad (3)$$

Figure 7:
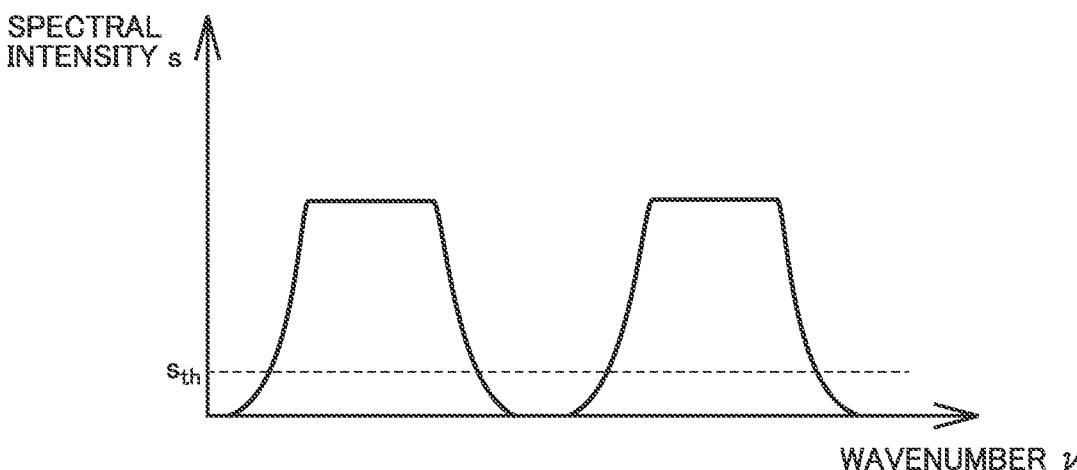
FIG. 7 is a conceptual diagram of determination processing by a wavenumber region determination unit.

FIG. 7 is a conceptual diagram of determination processing by wavenumber region determination unit 432b. A horizontal axis represents a wavenumber v, and a vertical axis represents a spectral intensity.

Wavenumber region determination unit 432b determines that a wavenumber region in which the spectral intensity is greater than threshold $s_{th}$ (wavenumber region satisfying Formula (3)) is a target of the phase matching processing, and determines that a wavenumber region in which the spectral intensity is less than or equal to threshold $s_{th}$ (wavenumber region not satisfying the following Formula (3)) is not a target of the phase matching processing. Hereinafter, the wavenumber region determined to be the target of the phase matching processing is referred to as "target wavenumber region".

In this example, wavenumber region determination unit 432b includes information regarding the target wavenumber region in a phase spectrum φ'(v, m, n). Phase spectrum φ'(v, m, n) is a parameter obtained by redefining the phase spectrum φ as in the following Formula (4).

[Expression 4]

$$\varphi'(v, m, n) = \begin{cases} \varphi(v, m, n), & \text{eq. (3) is satisfied} \\ 0, & \text{otherwise} \end{cases} \qquad (4)$$

The wavenumber region determination unit 432b uses phase spectrum q as phase spectrum φ' for a wavenumber satisfying Formula (3). That is, the phase is changed by φ for the wavenumber satisfying Formula (3). Meanwhile, wavenumber region determination unit 432b sets phase spectrum φ' (the phase value of the phase spectrum) to 0[rad] for a wavenumber that does not satisfy Formula (3). This means that the phase is maintained for the wavenumber that does not satisfy Formula (3).

Returning to FIG. 4, wavenumber region determination unit 432b outputs phase spectrum φ' to convolution operation unit 432c together with the interferogram i(x, m, n). Wavenumber region determination unit 432b may cause storage unit 434 to store phase spectrum φ'. When a plurality of measurements are performed and phase spectrum φ' does not change (in the case of repeatedly measuring under the same conditions, in the case of measuring the background, etc.), wavenumber region determination unit 432b may perform the following. Wavenumber region determination unit 432b causes storage unit 434 to store phase spectrum φ' in the first measurement. Wavenumber region determination unit 432b omits the arithmetic processing of Formulas (3) and (4) after the second measurement, and outputs phase spectrum φ' stored in storage unit 434 to convolution operation unit 432c. As a result, the operation load of controller 4 can be reduced. Note that storage unit 434 is implemented by storage 403 (see FIG. 1).

Figure 8:
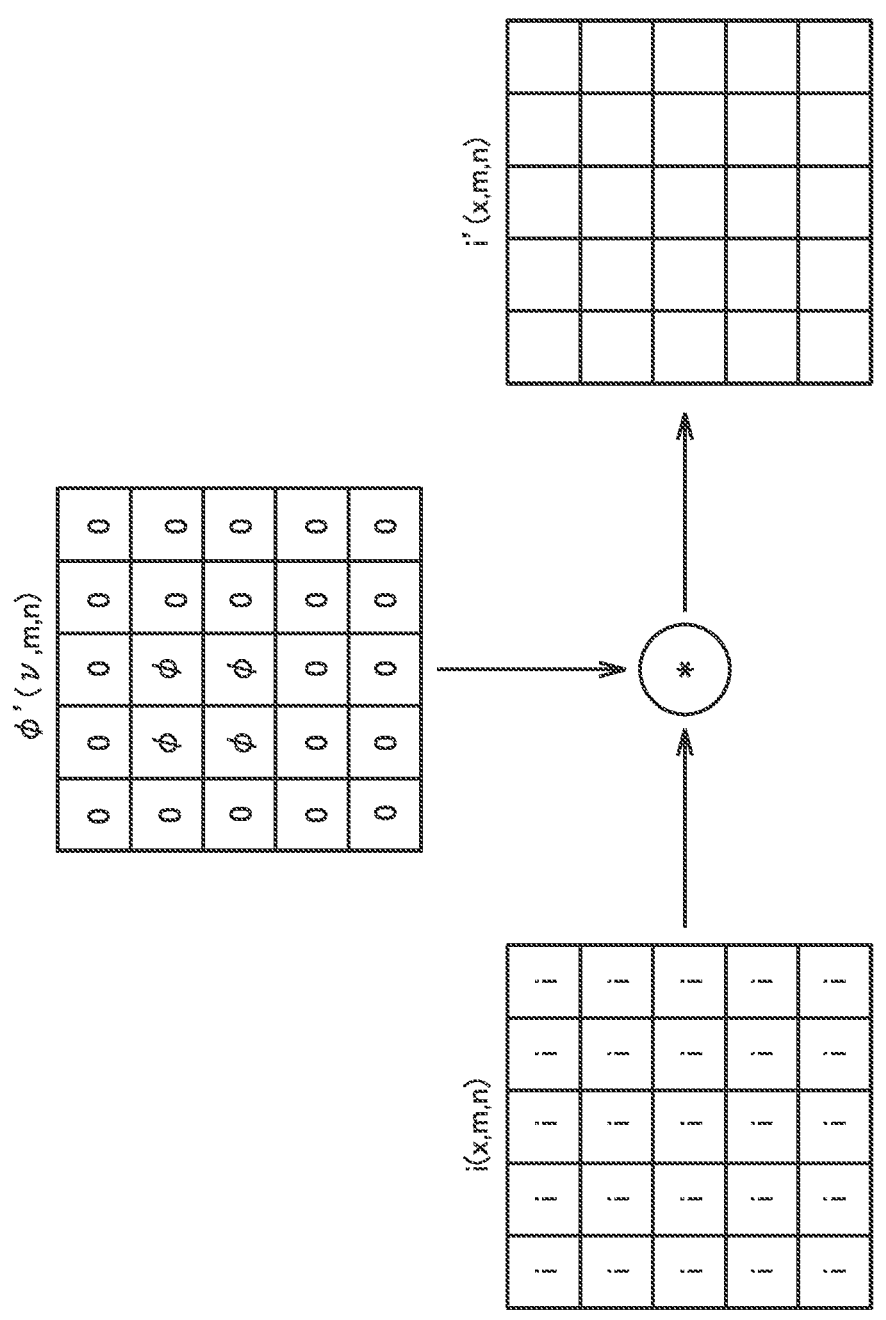
FIG. 8 is a conceptual diagram of a convolution operation by a convolution operation unit.

FIG. 8 is a conceptual diagram of a convolution operation by convolution operation unit 432c. As shown in FIG. 8, convolution operation unit 432c performs a two-dimensional convolution operation of interferogram i(x, m, n)

using phase spectrum φ' as a filter (kernel) (see the following Formula (5)). * means a convolution operation. F[ ] is an inverse Fourier transform function of a function serving as an argument. i is an imaginary unit. real( ) means acquiring the real part of a complex number. In this example, a stride is 1.

[Expression 5]

$$i'(x, m, n) = \text{real}\big(i(x, m, n) * F\big[e^{-i\varphi'(v,m,n)}\big]\big) \tag{5}$$

Formula (5) may be expressed as the following Formula (6).

[Expression 6]

$$i'(x, m, n) = \sum_{k=0}^{M}\sum_{l=0}^{N}\text{real}\big(i(x, k, l) * F\big[e^{-i\varphi'(v,m-k,n-l)}\big]\big) \tag{6}$$

The lead or lag of the phase of the interferogram occurs due to various error factors in quantum optical system 2. Such lead or lag of the phase is compensated by a convolution operation using phase spectrum φ'(v, m, n). More specifically, in phase spectrum φ'(v, m, n), the pixel having larger lead or lag of the phase has a larger value (weighting). When the phase spectrum φ'(v, m, n) functions as a smoothing filter to which a weighting coefficient corresponding to the lead/lag of the phase is given, the phase difference of interferogram i(x, m, n) between the target pixels is reduced, and the phases are preferably matched, as shown in a waveform B of FIG. 6. Convolution operation unit 432c outputs interferogram i'(x, m, n) subjected to phase matching to spatial integration processing unit 433.

Spatial integration processing unit 433 calculates interferogram I(x) by adding (spatially integrating) interferograms i'(x, m, n) subjected to phase matching for all target pixels (see the following Formula (7)).

[Expression 7]

$$I(x) = \sum_{m=m_{min}(n)}^{m_{max}}\sum_{n=n_{min}(m)}^{n_{max}} i(x, m, n) \tag{7}$$

The spatial integration results in interferogram I(x) as shown in a waveform C of FIG. 6. Spatial integration processing unit 433 outputs interferogram I(x) to Fourier transform unit 44.

Referring again to FIG. 3, Fourier transform unit 44 performs a Fourier transform on interferogram I(x). Interferogram I(x) is acquired in both a state where the sample is disposed in sample holder 24 and a state where the sample is not disposed in sample holder 24. A Fourier spectrum obtained by Fourier transform of interferogram I(x) acquired in a state where the sample is disposed in sample holder 24 is described as "$A_s(\omega)$" (ω: angular frequency). Meanwhile, a Fourier spectrum obtained by Fourier transform of interferogram I(x) acquired in a state where the sample is not disposed in sample holder 24 is described as "$A_s^0(\omega)$". Fourier transform unit 44 outputs Fourier spectrum $A_s(\omega)$ to first storage unit 45 and output unit 49, and outputs Fourier spectrum $A_s^0(\omega)$ to second storage unit 46.

First storage unit 45 non-volatilely stores Fourier spectrum $A_s(\omega)$ in a state where the sample is disposed in sample holder 24. Second storage unit 46 non-volatilely stores Fourier spectrum $A_s0(\omega)$ in a state where the sample is not disposed in the sample holder 24. Stored Fourier spectrum ($A_s(\omega)$ or $A_s0(\omega)$) is appropriately read by transmittance calculation unit 47. Note that first storage unit 45 and second storage unit 46 are implemented by storage 403 (see FIG. 1).

Transmittance calculation unit 47 calculates a complex transmittance spectrum T(ω) of the sample on the basis of Fourier spectrum $A_s(\omega)$ and Fourier spectrum $A_s^0(\omega)$. Note that the phase information of the sample itself is lost by the phase matching processing. Therefore, the complex transmittance spectrum t(ω) does not include the original wavelength dispersion of the sample but indicates the amplitude transmittance or the energy transmittance of the sample. Transmittance calculation unit 47 outputs the calculation results of complex transmittance spectrum t(ω) to absorption spectrum calculation unit 48 and output unit 49.

Absorption spectrum calculation unit 48 calculates an infrared absorption spectrum D(ω) of the sample based on complex transmittance spectrum t(ω) of the sample. Absorption spectrum calculation unit 48 outputs the calculation results of infrared absorption spectrum D(ω) to output unit 49.

Output unit 49 causes output device 6 to display the calculation results of by controller 4, that is, the Fourier spectrum $A_s(\omega)$, complex transmittance spectrum t(ω), and infrared absorption spectrum D(ω) of the sample. Details of these calculation methods can be referred in Patent Document 1.

<Processing Flow>

Figure 9:
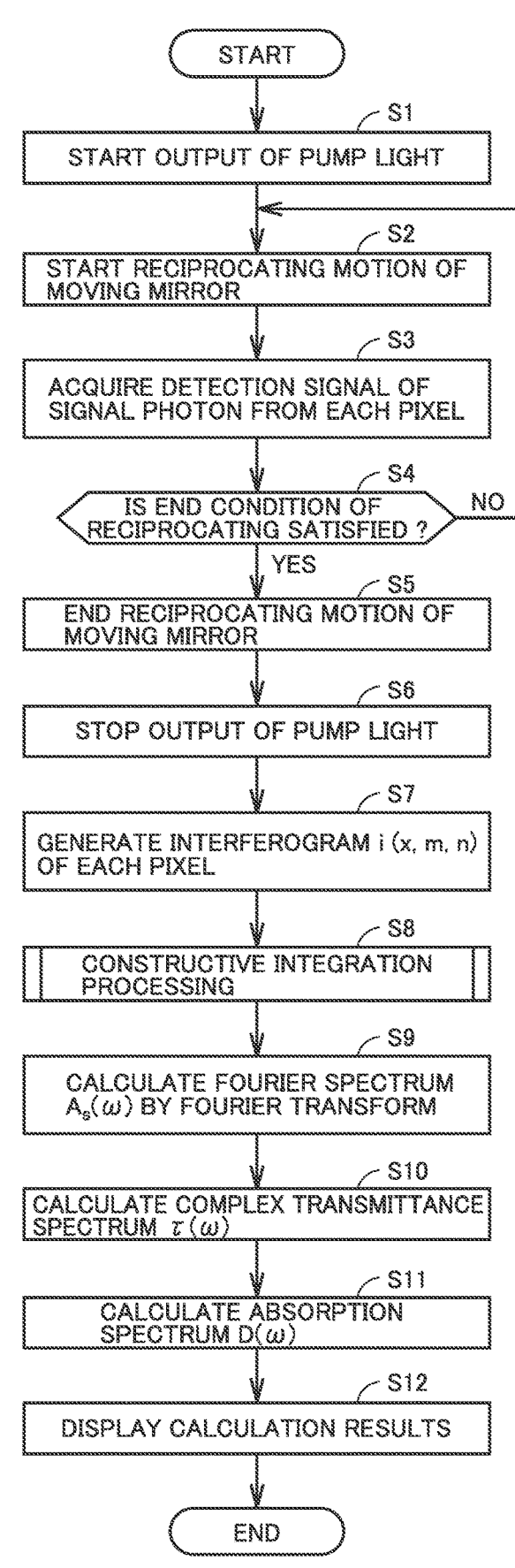
FIG. 9 is a flowchart illustrating the processing procedure of a quantum absorption spectroscopy method according to the present embodiment.

FIG. 9 is a flowchart illustrating the processing procedure of a quantum absorption spectroscopy method according to the present embodiment. The processing illustrated in the flowchart is executed when a predetermined condition is satisfied (for example, when an input device 5 accepts the operation of an operator). Each step is basically achieved by software processing by a controller 4, but may be achieved by a hardware (electric circuit) disposed in controller 4. Hereinafter, step is abbreviated as "S". It is assumed that a sample is installed in a sample holder 24 disposed on the idler optical path.

In S1, controller 4 controls a laser light source 1 to start the output of pump light.

In S2, controller 4 controls a drive device 250 provided with a moving mirror 25 to start (or continue) a high-speed reciprocating motion.

In S3, controller 4 acquires the detection signal of a signal photon from each of a plurality of pixels included in a photodetector 3.

In S4, controller 4 determines whether a condition for ending the reciprocating motion of moving mirror 25 is satisfied. For example, controller 4 can determine that the end condition is satisfied when moving mirror 25 is reciprocated for a specified number of times or a specified time. When the end condition is not satisfied (NO in S4), controller 4 returns the processing to S3. As a result, the processings of S2 and S3 are repeated until data for the specified number of times or the specified time is acquired. When the end condition is satisfied (YES in S4), controller 4 advances the processing to S5.

In S5, controller 4 controls drive device 250 of moving mirror 25 to stop the reciprocating motion of moving mirror 25.

In S6, controller 4 controls laser light source 1 to stop the output of the pump light.

In S7, controller 4 generates, for each pixel, interferogram i(x, m, n) based on the detected signals of the signal photons.

In S8, controller 4 performs constructive integration processing on interferogram i(x, m, n) generated for each pixel.

Figure 10:
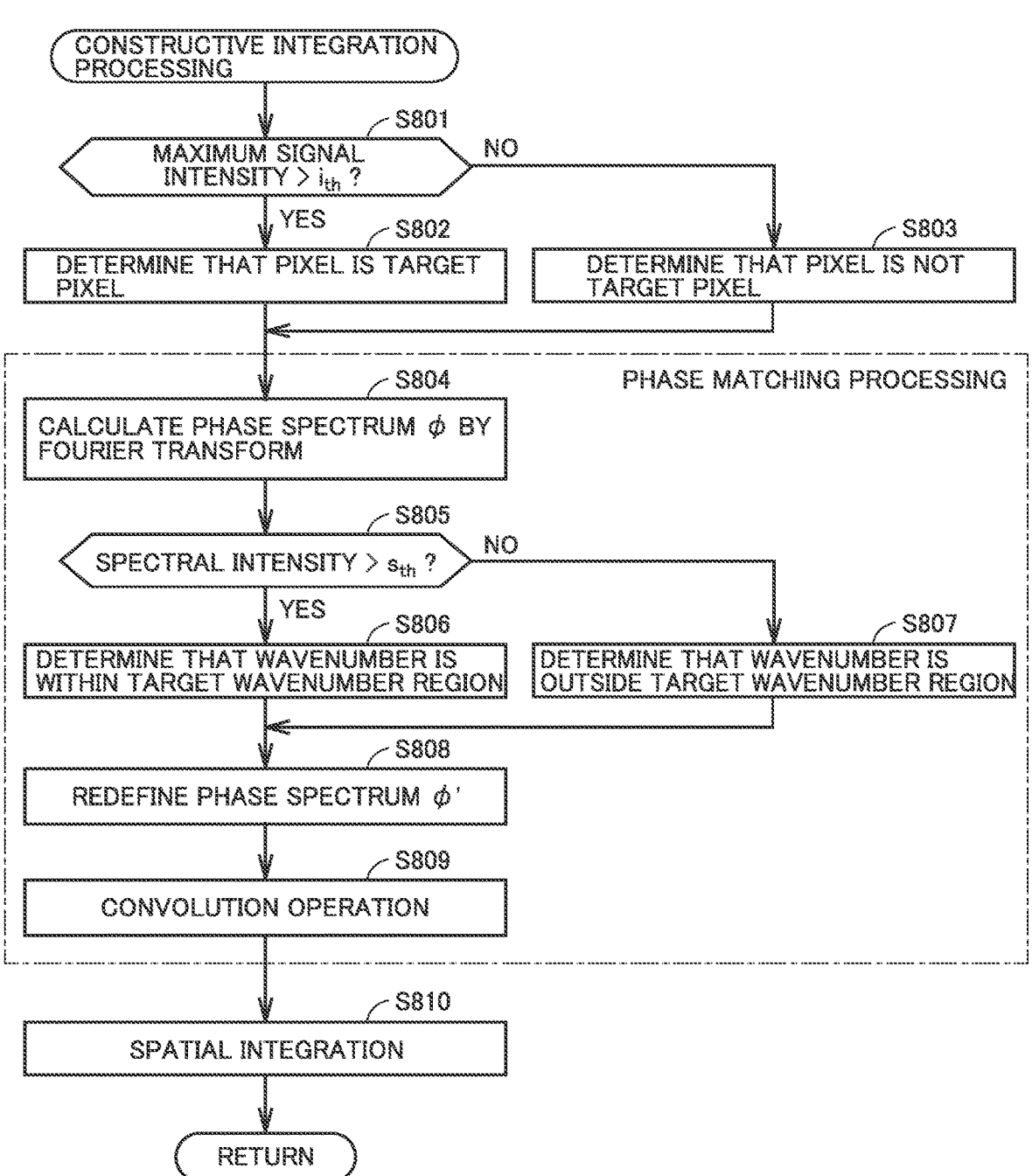
FIG. 10 is a flowchart illustrating the processing procedure of integration processing.

FIG. 10 is a flowchart illustrating the processing procedure of the integration processing. In S801, controller 4 determines, for each pixel (m, n), whether the maximum signal intensity of interferogram i(x, m, n) is greater than a threshold $i_{th}$ (see Formula (1)). Threshold $i_{th}$ is, for example, a fixed value determined in advance according to the configuration of a quantum optical system 2, but may be a variable value adjusted according to measurement conditions (laser power of laser light source 1, and gain of a photodetector 3, and the like).

When the maximum signal intensity of interferogram i(x, m, n) is greater than threshold $i_{th}$ (YES in S801), controller 4 determines that the pixel is a target pixel (S802). Meanwhile, when the maximum signal intensity of interferogram i(x, m, n) is less than or equal to threshold $i_{th}$ (NO in S801), controller 4 determines that the pixel is not the target pixel (S803). When the determination processing for all the pixels is completed, controller 4 advances the processing to S804.

Note that, here, an example in which determination is made based on the maximum signal intensity of the interferogram acquired from each of the plurality of pixels has been described. The maximum signal intensity is merely an example of "signal intensity" according to the present disclosure, and other parameters may be used. For example, the average signal intensity of a defined number of greater than or equal to 2 of interferograms (the average value of the number of detected signal photons by the defined number of pixels) may be used. Alternatively, the visibility of quantum interference $V=(i_{max}-i_{min})/(i_{max}+i_{min})$ calculated from the interferogram of each pixel may be used as the "signal intensity" (where $i_{max}$ is the maximum value of the number of detected photons, and $i_{min}$ is the minimum value of the number of detected photons). Any two or all of the maximum signal intensity, the average signal intensity, and the visibility may be used in combination.

In S804, controller 4 calculates a phase spectrum q(x, m, n) according to Fourier transform of interferogram i(v, m, n) for each target pixel (see Formula (2)). In the Fourier transform, a window function may be applied. As the window function, for example, a Happ-Genzel window or a triangular window may be used.

In S805, controller 4 determines whether a spectral intensity is greater than a threshold $s_{th}$ for each wavenumber v (see Formula (3)). Note that threshold $s_{th}$ may also be a fixed value determined in advance according to the device configuration of a quantum optical system 2, or may be a variable value adjusted according to the measurement conditions.

When the spectral intensity is greater than threshold $s_{th}$ (YES in S805), controller 4 determines that the wavenumber is within a target wavenumber region (S806). Meanwhile, when the spectral intensity is less than or equal to threshold $s_{th}$ (NO in S805), controller 4 determines that the wavenumber is outside the target wavenumber region (S807). When determination processing for all wavenumbers v is completed, controller 4 calculates a phase spectrum q' redefined according to Formula (4) (S808).

In S809, controller 4 performs the convolution operation of interferogram i(x, m, n) using phase spectrum q' for each target pixel (see Formula (5) or Formula (6)). As a result, a phase matching between the target pixels is achieved.

In S810, controller 4 spatially integrates an interferogram i'(x, m, n) on which the phase matching has been performed over all the target pixels (see Formula (7)). This results in an interferogram I(x) for all the target pixels.

Returning to FIG. 9, controller 4 calculates various spectra indicating the infrared absorption spectroscopy characteristic of a sample in subsequent processings of S9 to S11. These processings will be schematically described. Details of each processing are referred in Patent Document 1.

In S9, controller 4 calculates Fourier spectrum $A_s(\omega)$ by performing Fourier transform on interferogram I(x) in a state where the sample is disposed on an idler optical path.

In S10, controller 4 calculates a complex transmittance spectrum t(ω) of the sample by calculating a ratio between Fourier spectrum $A_s^0(\omega)$ in a state where the sample is not disposed on the idler optical path and Fourier spectrum $A_s(\omega)$ in a state where the sample is disposed on the idler optical path. Note that Fourier spectrum $A_s^0(\omega)$ is acquired by background measurement in advance.

In S11, controller 4 calculates infrared absorption spectrum D(ω) of the sample by calculating the square of the absolute value of complex transmittance spectrum t(ω) of the sample.

In S12, controller 4 controls output device 6 to display the calculation results of the infrared absorption spectroscopy characteristic by the processings of S9 to S11.

As described above, in the present embodiment, in the constructive integration processing, the phase matching processing is executed prior to the spatial integration processing. By matching the phases of the interferograms i(x, m, n) of the plurality of target pixels, the cancellation of the interferograms i(x, m, n) between the target pixels is suppressed. As a result, the intensity of interferogram I(x) obtained by the spatial integration is sufficiently increased. Main noise in quantum absorption spectroscopy system 100 is shot noise. For example, assuming that the detection signals from all (M×N) pixels are equal, as a result of the constructive integration processing, the intensity of the interferogram I(x) after the spatial integration increases by (M×N) times, whereas the magnitude of the shot noise increases only by √(M×N) times. Therefore, the SN ratio of quantum absorption spectroscopy system 100 is improved by √(M×N) times. Therefore, according to the present embodiment, the measurement accuracy of Q-FTIR can be improved.

From another point of view, if it is only necessary to achieve the same degree of measurement accuracy, it is possible to lower the required accuracy for the components of quantum optical system 2 that may cause the cancellation of the interferograms. For example, it is allowable to reduce the processing accuracy of the reflection/transmission wavefront of the optical element (moving mirror 25, fixed mirror 26, or lenses 211 to 214 or the like). It is also allowable to lower the control accuracy of the alignment of the optical element (relative inclination between moving mirror 25 and fixed mirror 26, or the like). Therefore, quantum optical system 2 can be easily implemented, and the member cost can be reduced.

[Aspects]

It is understood by those skilled in the art that the above exemplary embodiments are specific examples of the following aspects.

<First Term>

A system (100) for quantum absorption spectroscopy, the system comprising:

a quantum optical system (2) configured to change a phase of quantum interference occurring between a plurality of physical processes, in each of which a quantum entangled photon pair of a signal photon and an idler photon is generated;

a photodetector (3) including a plurality of pixels, each of the plurality of pixels detecting the signal photon in a state where a sample is arranged in an optical path of the idler photon, and outputting a detection signal from the detected signal photon; and a processor (401) that calculates an absorption spectroscopy characteristic of the sample based on an interferogram, the interferogram indicating a variation in a signal intensity acquired from each of the plurality of pixels in accordance with the change in the phase of the quantum interference, wherein processor (401)

applies a processing to reduce phase difference of the interferogram among the plurality of pixels, spatially integrates, over the plurality of pixels, the interferogram having gone through processing to reduce phase difference, and calculates the absorption spectroscopy characteristic based on the integrated interferogram.

<Second Term>

The system (100) according to First Term 1, wherein processor (401)

calculates a phase spectrum of the interferogram by a Fourier transform of the interferogram for each of the plurality of pixels, and performs a convolution operation of the interferogram by the phase spectrum to reduce the phase difference.

<Third Term>

The system (100) according to Second Term 2, wherein the plurality of pixels are arranged in a two-dimensional array, and processor (401) performs a two-dimensional convolution operation of the interferogram using the phase spectrum as a filter to reduce the phase difference.

According to First to Third Terms, the leading/lagging of the phase of the interferogram caused by various error factors in the quantum optical system is compensated by the reduction of the phase difference (more specifically, the convolution operation by the phase spectrum). This suppresses the cancellation of the interferograms between the pixels when spatially integrating the interferogram over the plurality of pixels. Thus, the intensity of the integrated interferogram is sufficiently high. Therefore, the measurement accuracy of the quantum absorption spectroscopy system can be improved.

<Fourth Term>

The system (100) according to any one of First to third Terms, wherein processor (401)

sets, as a target of reduction of the phase difference and a target of the spatial integration, a pixel having a signal intensity of the signal photon higher than a first threshold among the plurality of pixels, and unsets, as the target of the reduction of the phase difference and as the target of the spatial integration, a pixel having a signal intensity of the signal photon lower than the first threshold among the plurality of pixels.

According to Fourth Term, only the pixels having a signal intensity of a signal photon higher than the first threshold are set as the target of processing that follows (the reduction of the phase difference and the spatial integration and the like). As a result, the interferogram output from the pixel that detects only noise caused by stray light in the quantum optical system and dark noise of the photodetector, and the like is not used for the processing. Therefore, the measurement accuracy of the quantum absorption spectroscopy system can be further improved.

<Fifth Term>

The system (100) according to any one of Second to Fourth Terms, wherein processor (401)

sets, as a target of the reduction of the phase difference using the phase spectrum, a wavenumber at which a spectral intensity of the phase spectrum is higher than a second threshold, and unsets, as the target of the reduction of the phase difference using the phase spectrum, a wavenumber at which the spectral intensity is lower than the second threshold.

<Sixth Term>

The system (100) according to Fifth Term, wherein processor (401) sets a phase value of the phase spectrum to zero for the wavenumber at which the spectral intensity is lower than the second threshold.

According to Fifth Term and Sixth Term, only the wavenumber at which the spectral intensity is higher than the second threshold is set as a target of processing that follows (the reduction of the phase difference using the phase spectrum, and the like). As a result, an error factor (noise due to optical element deviation and wavelength dispersion and the like) in the quantum optical system is reduced, so that the measurement accuracy of the quantum absorption spectroscopy system can be further improved.

<Seventh Term>

The system (100) according to any one of Second to Sixth Terms, further comprising a memory (403) that stores the phase spectrum, wherein processor (401)

stores the phase spectrum calculated in first measurement in memory (403), and applies the processing to reduce the phase difference using the phase spectrum stored in memory (403) in second measurement when the phase spectrum does not change between the first measurement and the second measurement.

According to Seventh Term, when the phase spectrum does not change between the first measurement (may be background measurement in a state where the sample is not installed, or may be previous measurement among a plurality of measurements in a state where the sample is installed) and the second measurement (measurement in a state where the sample is installed following the background measurement, or may be measurement after the plurality of measurements), it becomes unnecessary to calculate the phase spectrum in the second measurement. As a result, the calculation load of the processor can be reduced.

<Eighth Term>

A method for quantum absorption spectroscopy, the method comprising:

(S2) changing a phase of quantum interference occurring between a plurality of physical processes, in each of which a quantum entangled photon pair of a signal photon and an idler photon is generated;

(S3) acquiring, in a state where a sample is arranged in an optical path of the idler photon, a detection signal from the signal photon from each of a plurality of pixels included in a photodetector (3); and (S8 to S11) calculating an absorption spectroscopy characteristic of the sample based on an interferogram, the interferogram indicating a variation in a signal intensity acquired from each of the plurality of pixels in accordance with the change in the phase of the quantum interference, wherein the calculating includes:

(S804 to S809) applying a processing to reduce phase difference of the interferogram among the plurality of pixels;

(S810) spatially integrating, over the plurality of pixels, the interferogram having gone through the processing to reduce phase difference; and (S9 to S11) calculating the absorption spectroscopy characteristic based on the integrated interferogram.

According to Eighth Term, similarly to First Term, the measurement accuracy of the method can be improved.

Although the embodiments of the present invention have been described, it should be considered that the embodiments disclosed herein are illustrative in all respects and not restrictive. The scope of the present invention is defined by the claims, and it is intended that meanings equivalent to the claims and all modifications within the scope are included.

What is claimed is:

1. A system for quantum absorption spectroscopy, the system comprising:

a quantum optical system configured to change a phase of quantum interference occurring between a plurality of physical processes, in each of which a quantum entangled photon pair of a signal photon and an idler photon is generated;

a photodetector including a plurality of pixels, each of the plurality of pixels detecting the signal photon in a state where a sample is arranged in an optical path of the idler photon, and outputting a detection signal from the detected signal photon; and a processor that calculates an absorption spectroscopy characteristic of the sample based on an interferogram, the interferogram indicating a variation in a signal intensity acquired from each of the plurality of pixels in accordance with the change in the phase of the quantum interference, wherein the processor applies a processing to reduce phase difference of the interferogram among the plurality of pixels, spatially integrates, over the plurality of pixels, the interferogram having gone through the processing to reduce phase difference, and calculates the absorption spectroscopy characteristic based on the integrated interferogram.

2. The system according to claim 1, wherein the processor calculates a phase spectrum of the interferogram by a Fourier transform of the interferogram for each of the plurality of pixels, and performs a convolution operation of the interferogram by the phase spectrum to reduce the phase difference.

3. The system according to claim 2, wherein the plurality of pixels are arranged in a two-dimensional array, and the processor performs a two-dimensional convolution operation of the interferogram using the phase spectrum as a filter to reduce the phase difference.

4. The system according to claim 2, wherein the processor sets, as a target of the reduction of the phase difference using the phase spectrum, a wavenumber at which a spectral intensity of the phase spectrum is higher than a second threshold, and unsets, as the target of the reduction of the phase difference using the phase spectrum, a wavenumber at which the spectral intensity is lower than the second threshold.

5. The system according to claim 4, wherein the processor sets a phase value of the phase spectrum to zero for the wavenumber at which the spectral intensity is lower than the second threshold.

6. The system according to claim 2, further comprising a memory that stores the phase spectrum, wherein the processor stores the phase spectrum calculated in first measurement in the memory, and applies the processing to reduce the phase difference using the phase spectrum stored in the memory in second measurement when the phase spectrum does not change between the first measurement and the second measurement.

7. The system according to claim 1, wherein the processor sets, as a target of reduction of the phase difference and as a target of the spatial integration, a pixel having a signal intensity of the signal photon higher than a first threshold among the plurality of pixels, and unsets, as the target of the reduction of the phase difference and as the target of the spatial integration, a pixel having a signal intensity of the signal photon lower than the first threshold among the plurality of pixels.

8. A method for quantum absorption spectroscopy, the method comprising:

changing a phase of quantum interference occurring between a plurality of physical processes, in each of which a quantum entangled photon pair of a signal photon and an idler photon is generated;

acquiring, in a state where a sample is arranged in an optical path of the idler photon, a detection signal from the signal photon from each of a plurality of pixels included in a photodetector; and calculating an absorption spectroscopy characteristic of the sample based on an interferogram, the interferogram indicating a variation in a signal intensity acquired from each of the plurality of pixels in accordance with the change in the phase of the quantum interference, wherein the calculating includes:

applying a processing to reduce phase difference of the interferogram among the plurality of pixels;

spatially integrating, over the plurality of pixels, the interferogram having gone through the processing to reduce phase difference; and calculating the absorption spectroscopy characteristic based on the integrated interferogram.

* * * * *